United States Patent
Dompe et al.

(10) Patent No.: US 11,765,092 B2
(45) Date of Patent: Sep. 19, 2023

(54) SYSTEM AND METHOD FOR SCALING DATA PATH PROCESSING WITH OFFLOAD ENGINES IN CONTROL PLANE

(71) Applicant: Hewlett Packard Enterprise Development LP, Houston, TX (US)

(72) Inventors: Diego Dompe, San Jose (CR); Laura Salazar, San Jose (CR); Jose Luis Uribe, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/354,584

(22) Filed: Jun. 22, 2021

(65) Prior Publication Data

US 2022/0407810 A1    Dec. 22, 2022

(51) Int. Cl.
*H04L 47/2483* (2022.01)
*H04L 47/125* (2022.01)
*H04L 47/2441* (2022.01)

(52) U.S. Cl.
CPC ........ *H04L 47/2483* (2013.01); *H04L 47/125* (2013.01); *H04L 47/2441* (2013.01)

(58) Field of Classification Search
CPC . H04L 47/2483; H04L 47/125; H04L 47/244; H04L 47/2441
See application file for complete search history.

(56) References Cited

U.S. PATENT DOCUMENTS

| | | | |
|---|---|---|---|
| 2009/0141634 A1* | 6/2009 | Rothstein | H04L 47/2483 370/236 |
| 2010/0004542 A1* | 1/2010 | Dasgupta | A61B 8/488 600/453 |
| 2013/0235868 A1* | 9/2013 | Owens | H04L 67/60 370/389 |
| 2014/0086255 A1* | 3/2014 | Gooch | H04L 47/17 370/389 |
| 2018/0288198 A1* | 10/2018 | Pope | H04L 63/0227 |
| 2019/0050273 A1* | 2/2019 | Tamir | H04L 47/23 |
| 2019/0325302 A1* | 10/2019 | Savic | G06N 3/045 |
| 2020/0028785 A1* | 1/2020 | Ang | G06F 9/45558 |
| 2020/0274952 A1* | 8/2020 | Waskiewicz | H04L 41/24 |

(Continued)

OTHER PUBLICATIONS

Khattak et al.,"TOSwitch: Programmable and High-Throughput Switch Using Hybrid Switching Chips", IEEE Communication Letters, vol. 23, No. 12, Dec. 2019, pp. 2266-2270, 2019.*

(Continued)

*Primary Examiner* — Kevin T Bates
*Assistant Examiner* — Ranjan Pant
(74) *Attorney, Agent, or Firm* — Park, Vaughan, Fleming & Dowler LLP (57) ABSTRACT

One aspect provides a network switch. The network switch includes hardware-based packet-processing logic for processing received packets, a processing unit, and an offload engine coupled to the processing unit. The offload engine is to offload, from the processing unit, packet-processing operations associated with a subset of the received packets. The offload engine comprises a processor core, at least one hardware packet-processing accelerator for performing the packet-processing operations, and a function-helper logic for interfacing between the processor core and the hardware packet-processing accelerator.

18 Claims, 8 Drawing Sheets

(56) References Cited

U.S. PATENT DOCUMENTS

2021/0218664 A1* 7/2021 Tillotson ............... H04L 45/04
2022/0292042 A1* 9/2022 Pope ................... G06F 9/4881

OTHER PUBLICATIONS

Miano et al, "Introducing SmartNICs in Server-based Data Plan processing", IEEE Access, DOI 10.1109, 2019.293349, 2019, 11 pages.*

BPF Documentation, "BPF Design Q&A", available online at <https://web.archive.org/web/20200330025129/https://www.kernel.org/doc/html/latest/bpf/bpf_design_QA.html>, Mar. 30, 2020, 6 pages.

Cilium, "BPF and XDP Reference Guide", available online at <https://docs.cilium.io/en/latest/bpf/>, 2021, 91 pages.

Miano et al., "Introducing SmartNICs in Server-Based Data Plane Processing: The DDoS Mitigation Use Case," IEEE Access, vol. 7, 2019, 11 pgs.

Netronome, "Agilio eBPF Software", available online at <https://www.netronome.com/products/agilio-software/agilio-ebpf-software/>, 2021, 6 pages.

\* cited by examiner

SYSTEM AND METHOD FOR SCALING DATA PATH PROCESSING WITH OFFLOAD ENGINES IN CONTROL PLANE

BACKGROUND

Field

This disclosure is generally related to data processing occurring at network switches. More specifically, this disclosure is related to a system and method for implementing hardware-based offload engines embedded in the switches.

Related Art

The scale of new computing paradigms poses a challenge for data processing in hardware architectures at the edge. Energy consumption and compute power limit the scale of what can be achieved in edge applications with traditional software stacks, like Linux-based system-on-chips (SoCs). On the other side of the spectrum, custom integrated circuits or field-programmable gate array (FPGA)-based solutions are efficient, but provide very little development and deployment flexibility when compared with traditional software stacks.

Such trade-off exists inside hardware architectures with high speed data interfaces on network switches. The switch data plane (e.g., hardware performing packet-forwarding processes and operations) can operate at speeds of terabits per second with limited flexibility. However, when flexible processing (e.g., exceptional cases) of packets is needed, the data plane hardware can direct those packets toward the control plane CPU for processing. The challenge is that the speed difference between the data plane hardware and the control plane CPU is of several orders of magnitude. Such a difference continues to increase as the processing speed of the data plane hardware (e.g., the switch application-specific integrated circuits (ASICs)) increases.

BRIEF DESCRIPTION OF THE FIGURES

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

The disclosed examples provide solutions to the technical problem of accelerating CPU's assisted data-path operations. Although able to process packets at high speed, switch ASICs have to forward packets requiring assisted data-path operations to the switch CPU, which mostly handles control-path operations and has limited processing speed. To accelerate the processing of those packets requiring flexible data-path operations, hardware-based offload engines for the CPUs can be provided (e.g., embedded in the switch ASIC) to allow certain packet-processing operations to be offloaded to hardware. In some examples, the hardware-based offload engines can include processor cores executing the extended Berkeley Packet Filter (eBPF) instruction set. Such processor cores do not run an operating system and, hence, can be compact and energy-efficient. Parallel implementation of multiple processor cores allows for scaling.

Figure 1:
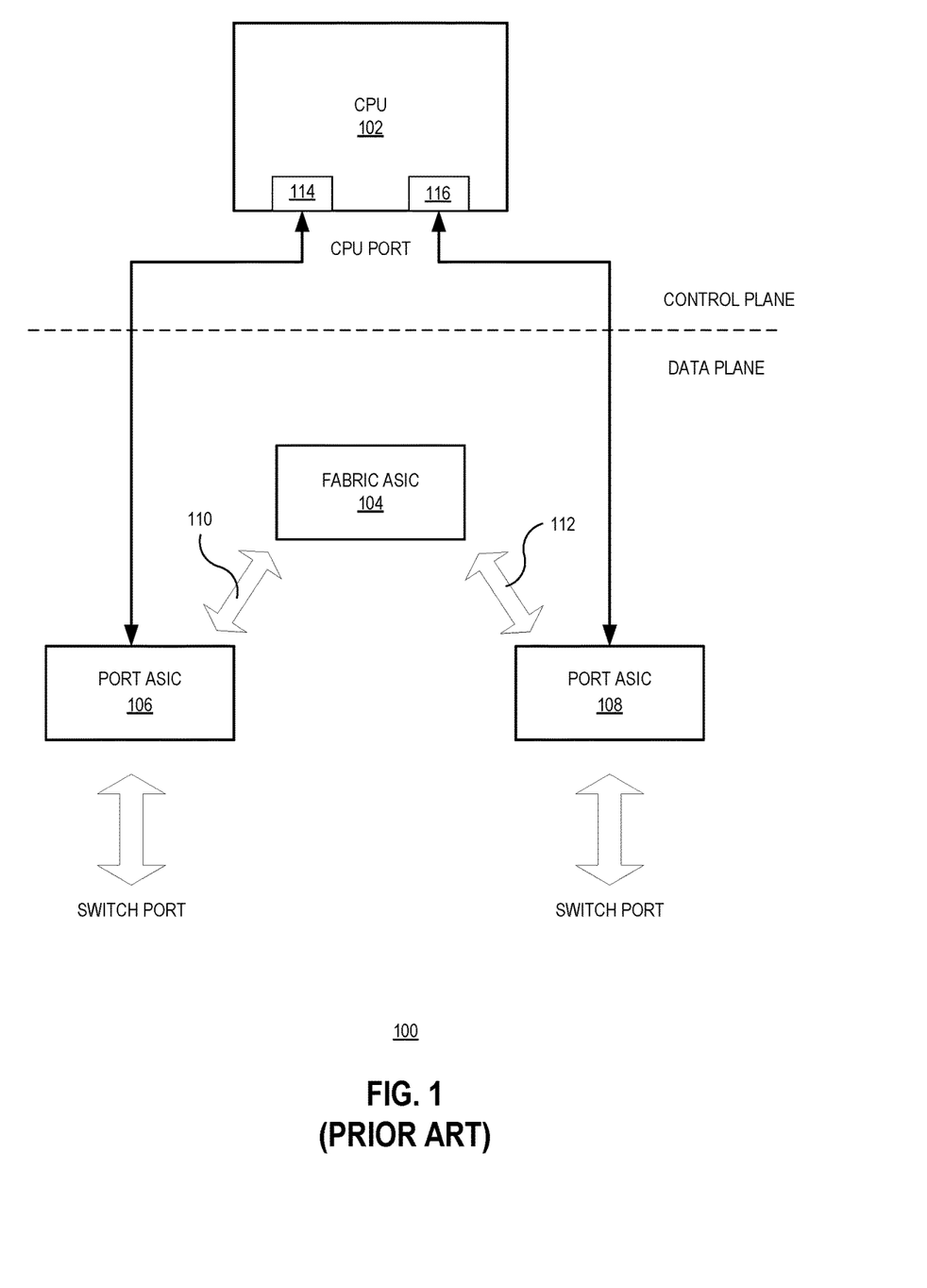
FIG. 1 illustrates an exemplary scenario for processing packets by a network switch, according to prior art.

FIG. 1 illustrates an exemplary scenario for processing packets by a network switch, according to prior art. In FIG. 1, network switch 100 includes a CPU 102, which typically is a general purpose CPU, resides in the control plane and handles control plane operations such as handling network protocol, populating the routing table, and making routing decisions. Network switch 100 also includes a number of special purpose ICs (e.g., fabric ASIC chip 104, switch-port ASIC chips 106 and 108) residing in the data plane to handle high-speed packet forwarding. Note that each switch-port ASIC chip (e.g., chip 106 or 108) can control a number of ports and handle processing of packets upon ingress or egress of the ports. Fabric ASIC chip 104, on the other hand, handles the interconnection among the switch ports via fabric links 110 and 112.

The switch ASICs (e.g., fabric ASIC chip 104, switch-port ASIC chips 106 and 108) are specially designed to provide high-speed packet processing capability and are often referred to as the "fast path" for packets. However, they lack certain flexibility in terms of packet processing. For example, they are not equipped to handle exceptions. In such a situation, the switch ASICs have to send the packets to CPU 102 for processing (e.g., via CPU ports 114 and 116). In addition to handling exceptions, CPU 102 also handles other operations, such as packet sampling, security processes, learning, metric collection, etc. As discussed previously, the software-based processing is orders of magnitude slower than the fast path. In fact, it is often referred to as the "slow path" for packets. In addition to its slower speed, the slow path also suffers other problems, such as lack of real-time guarantees and inability to scale up linearly with the number of switch ASICs.

The speed mismatch between the fast path and the slow path and the inability of the general purpose CPU to scale up become the bottleneck for increasing the packet-processing speed of the network switch. The CPU often needs to throttle traffic from the switch port, which may lead to protocol timeout and, hence, degradation in performance. A number of solutions have been proposed to solve this problem. One solution is to integrate flexible logic into the data plane pipelines (e.g., the switch ASICs) using microcode. However, such an approach is not meant for general purpose computing at scale and the flexible logic cannot be reused in other ASIC designs. Another solution is to include CPUs or microcontrollers in the data plane, but doing so can add cost to the design and usually requires a custom real-time operating system (RTOS) solution that also lacks re-usability and standard interfaces to communicate with the higher layers of the software stack.

In some examples included in this disclosure, a hardware building block is provided as a packet-processing offload engine for the control plane CPU. The hardware building block can be leveraged across multiple designs (ASIC or FPGA) and can provide a production quality development environment. To facilitate interaction with higher layers of the software stack, the hardware building block includes standardized interfaces. In one example, the hardware building block can include one or more cores implementing the extended Berkeley Packet Filter (eBPF) instruction set.

Unlike other instruction sets, eBPF is designed with a narrow set of requirements to run safe code inside the Linux kernel, and therefore offers particular advantages to offload engines. It has a mature software stack (e.g., compilers, debuggers, etc.) and a golden reference model inside the Linux kernel. eBPF applications in the kernel include tracing, monitoring, security, networking, and analytics. The eBPF instruction set is maintained by an active open source community, and the architecture has support for hardware offloading. Moreover, eBPF programs are very simple and resource-constrained, comprising 4 Kb of instructions and a 512 byte fixed-size stack, yet they provide a standard set of interfaces for interaction with other software (e.g., hash tables, histograms). The constraint in resources reduces cost in hardware implementation.

Figure 2:
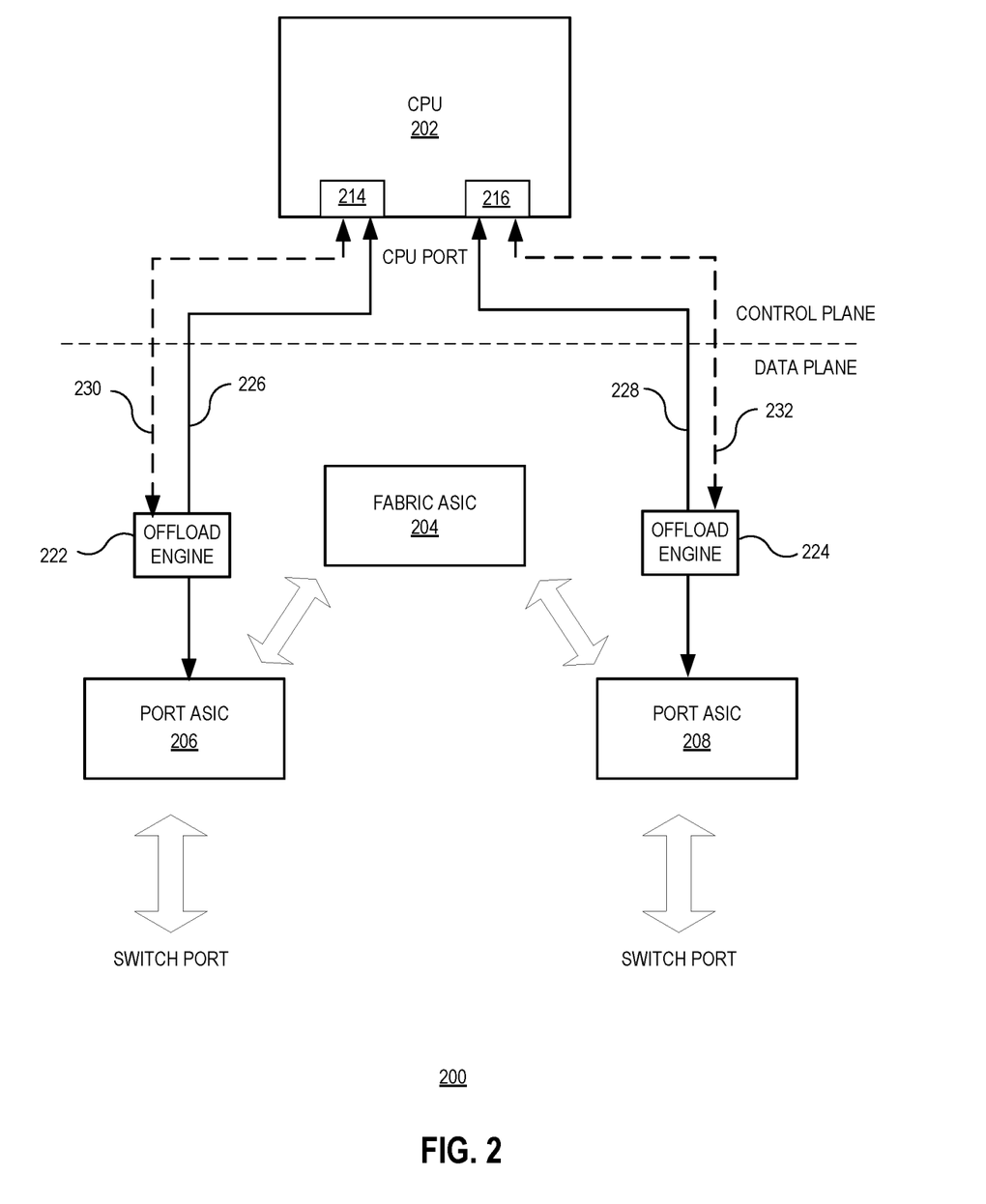
FIG. 2 illustrates an exemplary scenario for processing packets by a network switch, according to one aspect of this application.

FIG. 2 illustrates an exemplary scenario for processing packets by a network switch, according to one aspect of this application. Similar to switch 100 shown in FIG. 1, switch 200 includes a control plane CPU 202 and a number of switch ASICs, such as fabric ASIC 204 and port ASICs 206 and 208. Moreover, switch 200 also includes a number of offload engines (e.g., offload engines 222 and 224). These offload engines are in the data path between control plane CPU 202 and the port ASICs. For example, offload engine 222 is in data path 226 between control plane CPU 202 and port ASIC 206, and offload engine 224 is in data path 228 between control plane CPU 202 and port ASIC 208. These engines can offload certain packet-processing operations (e.g., handling exceptions) from control plane CPU 202. Note that, compared with software-based operations of CPU 202, the offload engines are hardware based and can operate at higher speed.

For example, while processing ingress packets, port ASIC 222 may encounter an exception that it is unable to handle. In response, port ASIC 222 directs the affected packet toward CPU 202, requesting CPU 202 to perform further, more flexible processing. While on its way to CPU 202, such a packet arrives at offload engine 222, which has been programmed beforehand by CPU 202 to perform the flexible processing on the exception packet. After processing, offload engine 222 can return the packet to port ASIC 206 for forwarding and also report the processing result to CPU 202. In certain situations, the logic on offload engine 222 may also determine that certain packets require operations that cannot be handled by the offload engine and will in turn allow these packets to pass through without processing. In such situations, those packets will eventually be processed by CPU 202. In some examples, the logic on an offload engine for determining whether a packet is to be processed by the offload engine or by CPU 202 can be programmed by CPU 202. Allowing the offload engines to offload certain operations from CPU 202 reduces the amount of packets arriving at CPU 202, thus increasing efficiency. In addition to processing exception packets, the offload engines can also be programmed to capture analytics information from packet flows and provide summarized data to upper software layers.

Other than the data path (e.g., path 226 or 228) between a port ASIC and control plane CPU 202, there also exists a control path between the corresponding offload engine and control plane CPU 202. In FIG. 2, the control paths (e.g., paths 230 and 232) are indicated using dashed lines. The control path between an offload engine and control plane CPU 202 allows CPU 202 to load programs (e.g., load eBPF instructions) into the offload engine (e.g., into its instruction memory). More specifically, CPU 202 can access context or data memory within the offload engine to write and read states from the memory, thus providing a channel for configuration or collection of data in both directions. Note that the offload engine is different from the Programming Protocol-independent Packet Processors (P4) program, which describes the forwarding behavior but does not specify the behavior of the control plane.

The offload engines are different from embedded CPUs, which can be bulky and consume a relatively large amount of energy. More specifically, unlike embedded CPUs, the offload engines do not run any operating system (OS). Instead, they are simple packet processors that run to completion (e.g., processing each packet by a single thread). Not running the OS makes it possible for the offload engines to be compact in size and energy-efficient.

As discussed previously, it is advantageous for eBPF instructions to be implemented in offload engines because they are a constrained set and capable of providing standard interfaces. In some examples, the offload engine for the control plane CPU can include a complex of cores that natively execute eBPF instructions.

Figure 3:
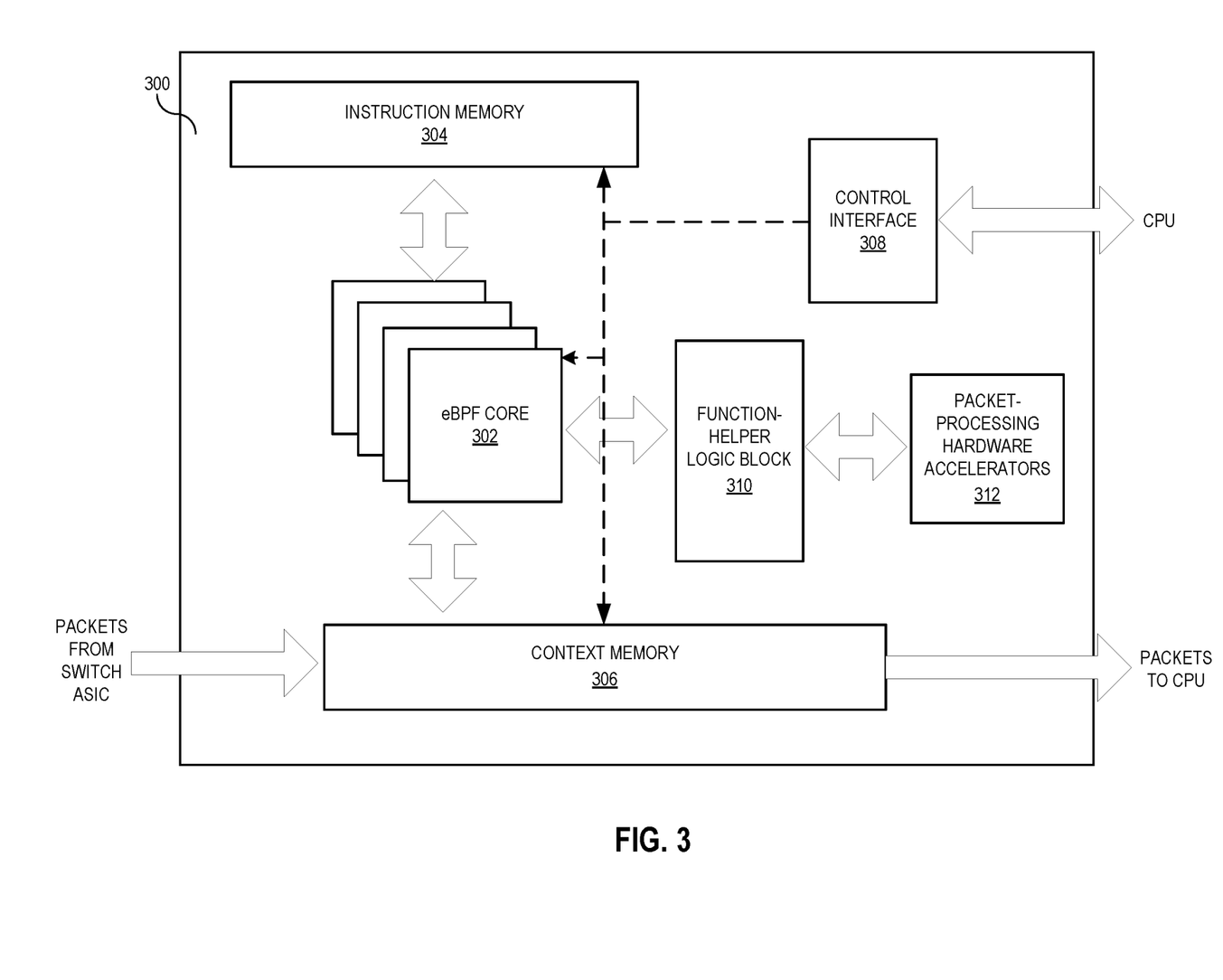
FIG. 3 illustrates an exemplary block diagram of an eBPF engine, according to one aspect of this application.

FIG. 3 illustrates an exemplary block diagram of an eBPF engine, according to one aspect of this application. eBPF engine 300 can include a number of eBPF cores (e.g., eBPF core 302), an instruction memory 304, a context memory 306, a control interface 308, a function-helper logic block 310, and a number of packet-processing hardware accelerators 312.

Each eBPF core can be a processor executing eBPF instructions, which are stored in instruction memory 304. An external CPU (e.g., the control plane CPU) can load programs (e.g., eBPF instructions) into instruction memory 304 via control interface 308.

In the example shown in FIG. 3, there are multiple eBPF cores. Note that because each eBPF core is small (they don't need to run an operating system and, hence, have a simpler structure), it is possible to include a large number (e.g., tens or hundreds) of eBPF cores in eBPF engine 300. Two different implementations (the parallel implementation and the pipeline implementation) can be used. In the parallel implementation, the multiple eBPF cores can perform the same operation (i.e., executing the same eBPF instructions on different packets) in parallel. In the pipeline implementation, different eBPF cores can execute different instructions (i.e., processing of a packet may involve operations performed by multiple cores). It is also possible to divide the eBPF cores into different groups, with some groups doing parallel processing and some groups doing pipeline processing.

The external CPU can similarly access context memory 306. In some examples, context memory 306 can store state information and data that can be fetched by the external CPU. In addition, context memory 306 can temporarily store packets that need flexible processing. For example, when the switch ASIC determines that certain packets need processing that is beyond its capability, the switch ASIC directs such packets toward the control plane CPU. Because eBPF engine 300 is on the data path between the switch ASIC and the control plane CPU, these packets will first arrive at eBPF engine 300 and be deposited into context memory 306. By executing the eBPF instructions, the eBPF core can determine whether the processing of a packet should be offloaded to hardware or be done by the control plane CPU. If it is determined that the processing of the packet should be performed by the control plane CPU, the packet can pass through context memory 306 to be sent to the control plane CPU without being processed.

On the other hand, if it is determined that the processing of the packet should be offloaded to hardware, the packet can be processed by one or more of packet-processing hardware accelerators 312.

Function-helper logic block 310 handles offloading functions, including the interaction between the eBPF cores and packet-processing hardware accelerators 312. In other words, function-helper logic block 310 bridges between the eBPF cores and packet-processing hardware accelerators 312 by providing a hardware interface to each respective hardware accelerator. In conventional eBPF implementations, when a particular operation outside of the eBPF program is to be performed, the eBPF program can call an outside program using the standard "calling" convention, such as a function call. Such a software behavior can be mimicked by hardware with the help of function-helper logic block 310. More particularly, the eBPF core can execute the call function as normal (without any modification). After the call function arrives at function-helper logic block 312, it is parsed and relevant content (e.g., packet payload or header or both) extracted from context memory 306 can be sent to an appropriate hardware accelerator via a corresponding hardware interface on function-helper logic block 310. In other words, offloading the packet-processing operations to hardware accelerators 312 can be transparent to the eBPF cores.

Both the eBPF cores (e.g., eBPF core 302) and function-helper logic 310 can access shared memory regions (e.g., instruction memory 304 and context memory 306) where states can be stored and read. The layout and access ports of the memories need to be organized in such a way that they are compatible with how the unmodified eBPF programs work, but also finding ways to minimize the memory requirements in the hardware implementation. In other words, the behavior of eBPF programs (e.g., how they access the memories) can be the same as if the eBPF programs are executed inside the Linux kernel. No modification to the eBPF instructions is needed. To increase the memory efficiency, instead of allocating a memory region for each core, instruction memory 304 can be shared by all eBPF cores, as shown in FIG. 3. Different cores executing the same code can access the same memory region storing such code. At the same time, instruction memory 304 can also be configured to allow it to be sliced flexibly into different areas for storing different codes.

Packet-processing hardware accelerators 312 can include a number of hardware accelerators that perform various packet-processing operations, including but not limited to: encryption/decryption of packets, encapsulation/decapsulation of packets, packet-filtering operations (e.g., TCAM-based packet filtering operations), flow-identification operations, data-analyzing operations, etc.

Figure 4A:
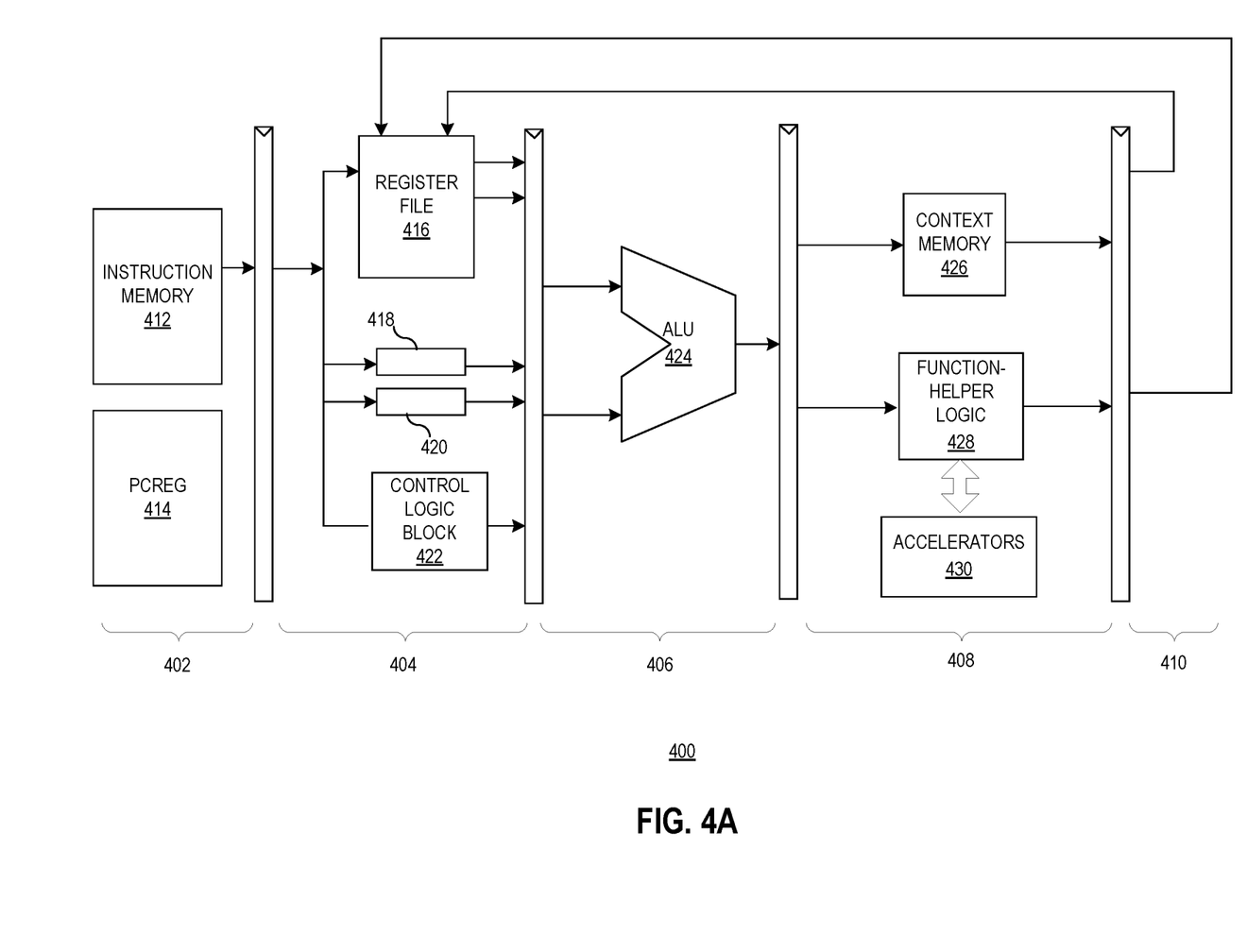
FIG. 4A illustrates an exemplary hardware implementation of an eBPF engine, according to one aspect of this application.

FIG. 4A illustrates an exemplary hardware implementation of an eBPF engine, according to one aspect of this application. In FIG. 4A, eBPF engine 400 includes an instruction fetch stage 402, an instruction decode stage 404, an execute stage 406, a memory access stage 408, and a writeback stage 410.

Instruction fetch stage 402 can include instruction memory 412 and a program counter (PCReg 414). Instruction memory 412 stores the eBPF instruction set, which can be loaded and modified (e.g., in the event of software upgrade) by an external CPU. PCReg 414 holds the address that is presented to instruction memory 412. During a clock cycle, the instruction is read out from instruction memory 412 and a calculation is done to determine the next program counter. The eBPF instruction set contains a limited set of instructions. Hence, instruction memory 412 can be quite small (e.g., 4 Kb).

Instruction decode stage 404 can include a register file 416, sign extension logic blocks 418 and 420, and a control logic block 422. Different bits of the instructions (which typically are 64-bit instructions) can be separately sent to register file 416, sign extension logic blocks 418 and 420, and control logic block 422. For example, the first eight bits of an instruction can include an opcode that is sent to control logic block 422, and the next eight bits can be sent to register file 416 to identify two registers to read. Other bits of the instruction can be extended by sign extension logic blocks 418 and 420. Note that eBPF engine 400 is designed to support instructions of up to 64 bits. However, LDDW (load double word from memory) instructions are exceptions to the rule and can be 128 bits long. In one example, the 128-bit LDDW instruction can be detected and interpreted as two consecutive 64-bit instructions. Interpreting an LDDW instruction as two instructions allows eBPF engine 400 to execute the LDDW instruction without requiring any modification to the software. This is different from conventional approaches where the software instruction is modified to maximize the efficiency in hardware.

Execute stage 406 is where the actual computation occurs and can include an arithmetic logic unit (ALU) 424. For simplicity of illustration, other components (e.g., an operand selector) in execute stage are not shown in FIG. 4A.

Memory access stage 408 is where context memory 426 is accessed. As discussed before, the to-be-processed packets can be temporarily stored in context memory 426 and can be processed through the pipeline by being loaded to register file 416 and then used for computation by ALU 424. The outcome of the computation can be stored in context memory 426. In addition to context memory 426, memory access stage 406 can also include function-helper logic 428 and accelerators 430. Function-helper logic 428 includes hardware interfaces to accelerators 430, thus allowing certain packet-processing operations to be offloaded to accelerators 430. At writeback stage 410, processing results from the instructions write their results, including results received by function-helper logic 428, to register file 416.

Figure 4B:
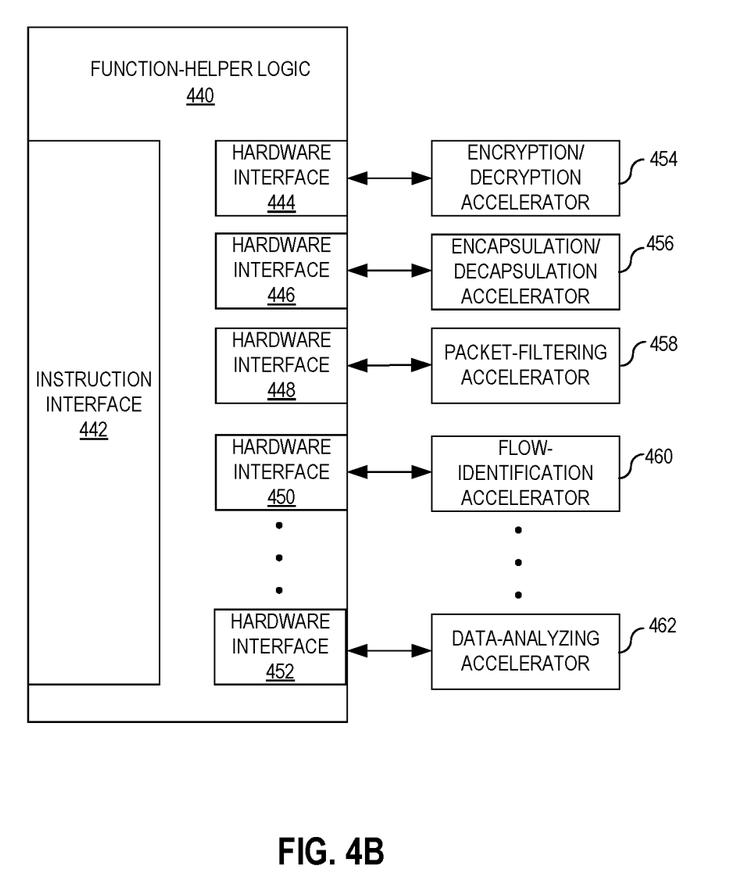
FIG. 4B illustrates in more detail the function-helper logic, according to one aspect of the instant application.

FIG. 4B illustrates in more detail the function-helper logic, according to one aspect of the instant application. Function-helper logic 440 can be a hardware logic block that includes an instruction interface 442 and a number of hardware interfaces (e.g., hardware interfaces 444-452). Instruction interface 442 receives instructions from the eBPF core along with to-be-processed data (e.g., a to-be-encrypted packet). Hardware interfaces 444-452 facilitate the coupling between function-helper logic 440 and a number of hardware accelerators to allow the to-be-processed data to be sent to the appropriate hardware accelerator for processing. For example, an encryption/decryption accelerator 454 is coupled to function-helper logic 440 via hardware interface 444, an encapsulation/decapsulation accelerator 456 is coupled to function-helper logic 440 via hardware interface 446, a packet-filtering accelerator 458 is coupled to function-helper logic 440 via hardware interface 448, a flow-identification accelerator 460 is coupled to function-helper logic 440 via hardware interface 450, and a data-analyzing accelerator 462 is coupled to function-helper logic 440 via hardware interface 452. Each hardware interface can be specially designed based on the type and the implementation of the coupled hardware accelerator.

In the example shown in FIG. 2, the offload engines are standalone devices that are placed on the path (e.g., a connecting cable) between a switch ASIC and the corresponding CPU port. Note that in the rare situation where multiple (e.g., two) paths connect the switch ASIC and the network port of the CPU, multiple offload engines will be needed, one per path. This is to ensure that all packets directed toward the control plane CPU can be offloaded to hardware whenever possible.

Figure 5A:
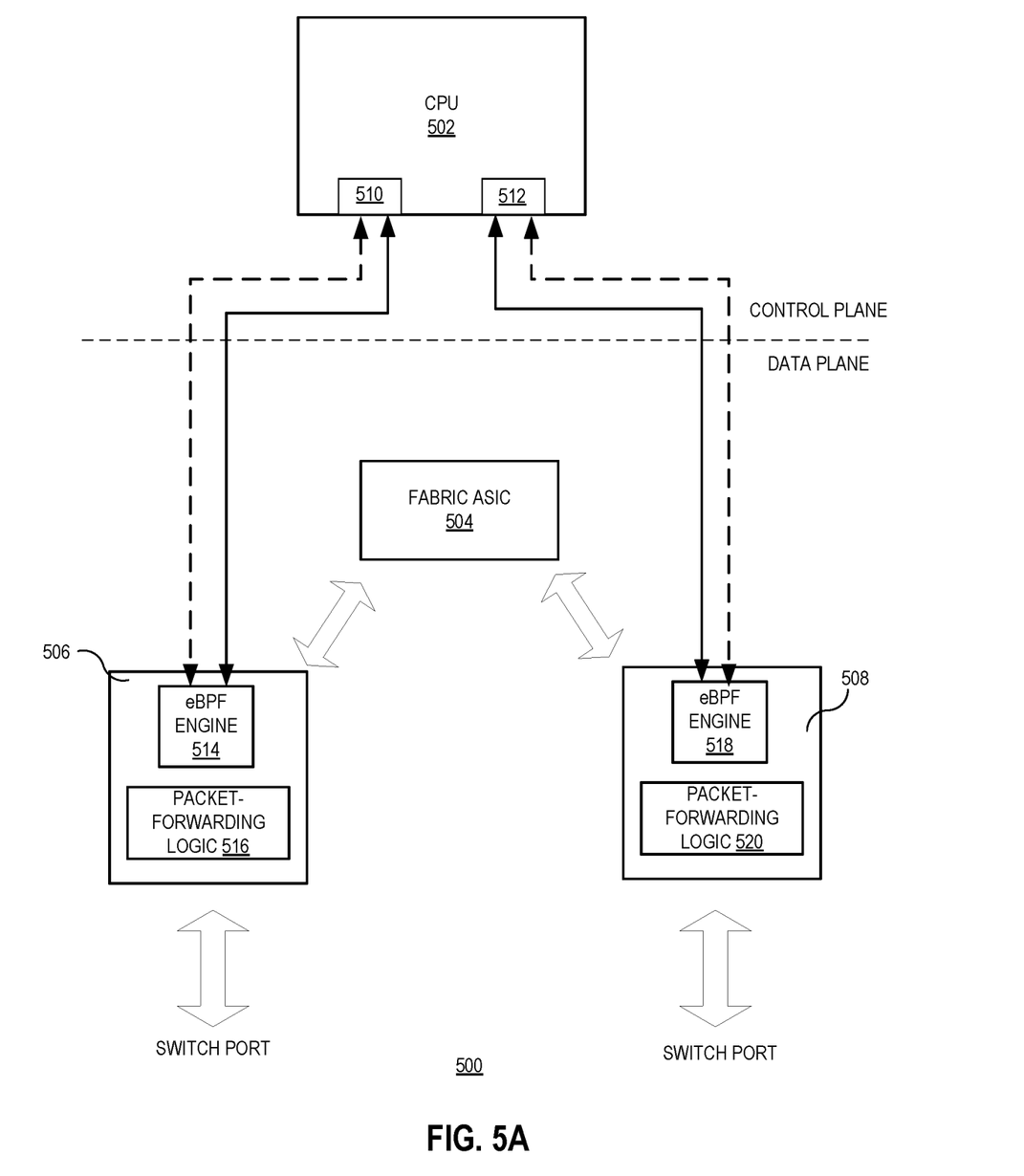
FIG. 5A illustrates an exemplary network switch, according to one aspect of this application.

In addition to being a standalone device, an offload engine can be embedded either in the port ASIC or the CPU network port. FIG. 5A illustrates an exemplary network switch, according to one aspect of this application. In FIG. 5A, a network switch 500 includes a control plane CPU 502 and a number of switch ASIC chips, such as fabric ASIC chip 504 and port ASIC chips 506 and 508. CPU 502 includes network ports 510 and 512 for communicating, respectively, with port ASIC chips 506 and 508.

Each port ASIC not only includes the standard logic for forwarding packets but also includes an eBPF engine. For example, port ASIC chip 506 includes an eBPF engine 514 and packet-forwarding logic 516, and port ASIC chip 508 includes an eBPF engine 518 and packet-forwarding logic 520. Packet-forwarding logics 516 and 520 can include standard switch port logic for forwarding packets. eBPF engines 514 and 518 can be similar to eBPF engine 300 shown in FIG. 3 and can be implemented in a way similar to what is shown in FIG. 4A. Each eBPF engine can be an integrated part of the port ASIC chip.

Figure 5B:
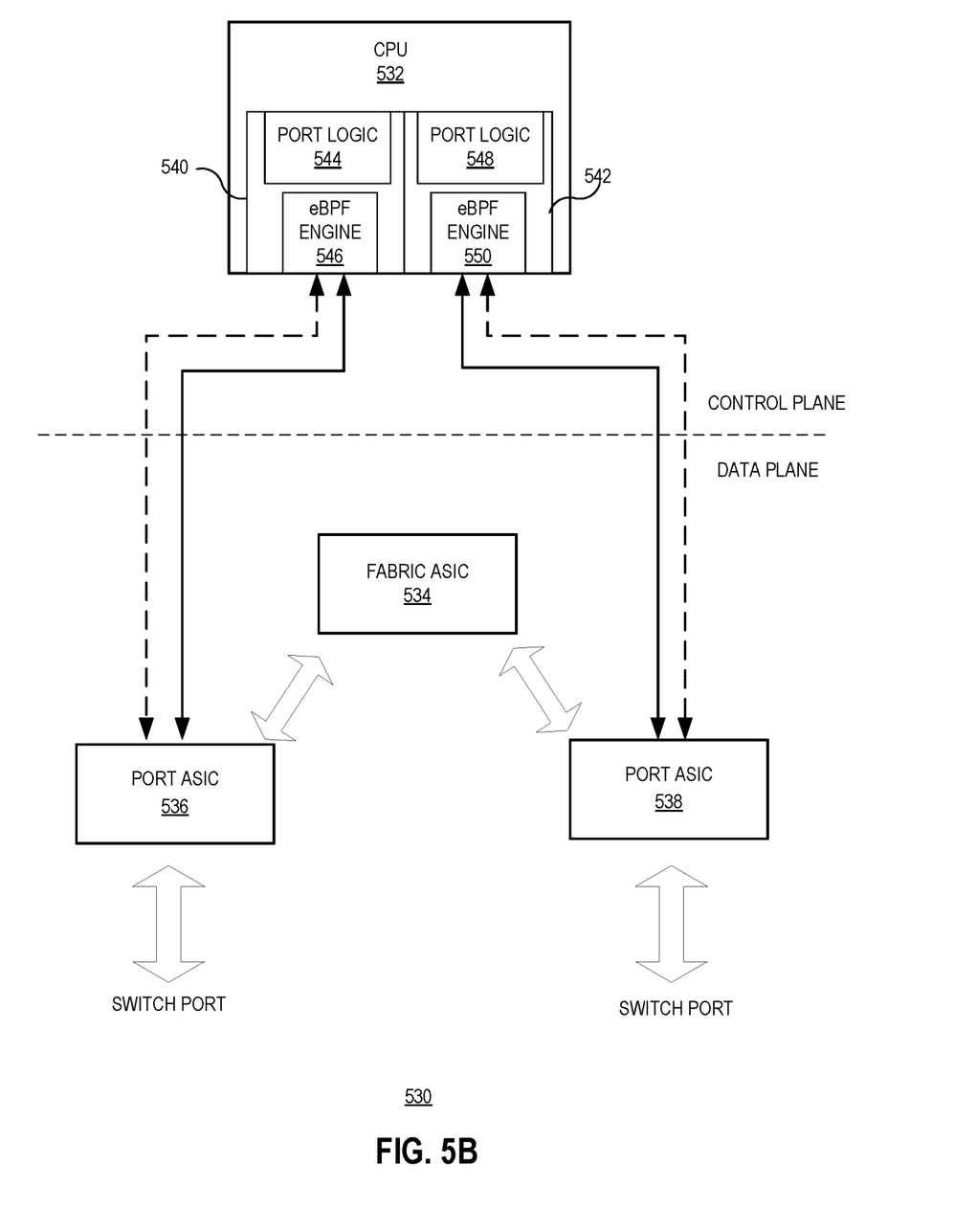
FIG. 5B illustrates an exemplary network switch, according to one aspect of this application.

FIG. 5B illustrates an exemplary network switch, according to one aspect of this application. In FIG. 5B, a network switch 530 includes a control plane CPU 532 and a number of switch ASIC chips, such as fabric ASIC chip 534 and port ASIC chips 536 and 538. CPU 532 includes network ports 540 and 542 for communicating, respectively, with port ASIC chips 536 and 538.

Each network port of the CPU not only includes the standard logic for facilitating the communication between the CPU and the port ASICs but also includes an eBPF engine. For example, network port 540 includes port logic 544 and an eBPF engine 546, and network port 542 includes port logic 548 and an eBPF engine 550. Port logics 544 and 548 can include standard network communication logic. eBPF engines 546 and 550 can be similar to eBPF engine 300 shown in FIG. 3 and can be implemented in a way similar to what is shown in FIG. 4A. Each eBPF engine can be an integrated part of the CPU network port.

Figure 6:
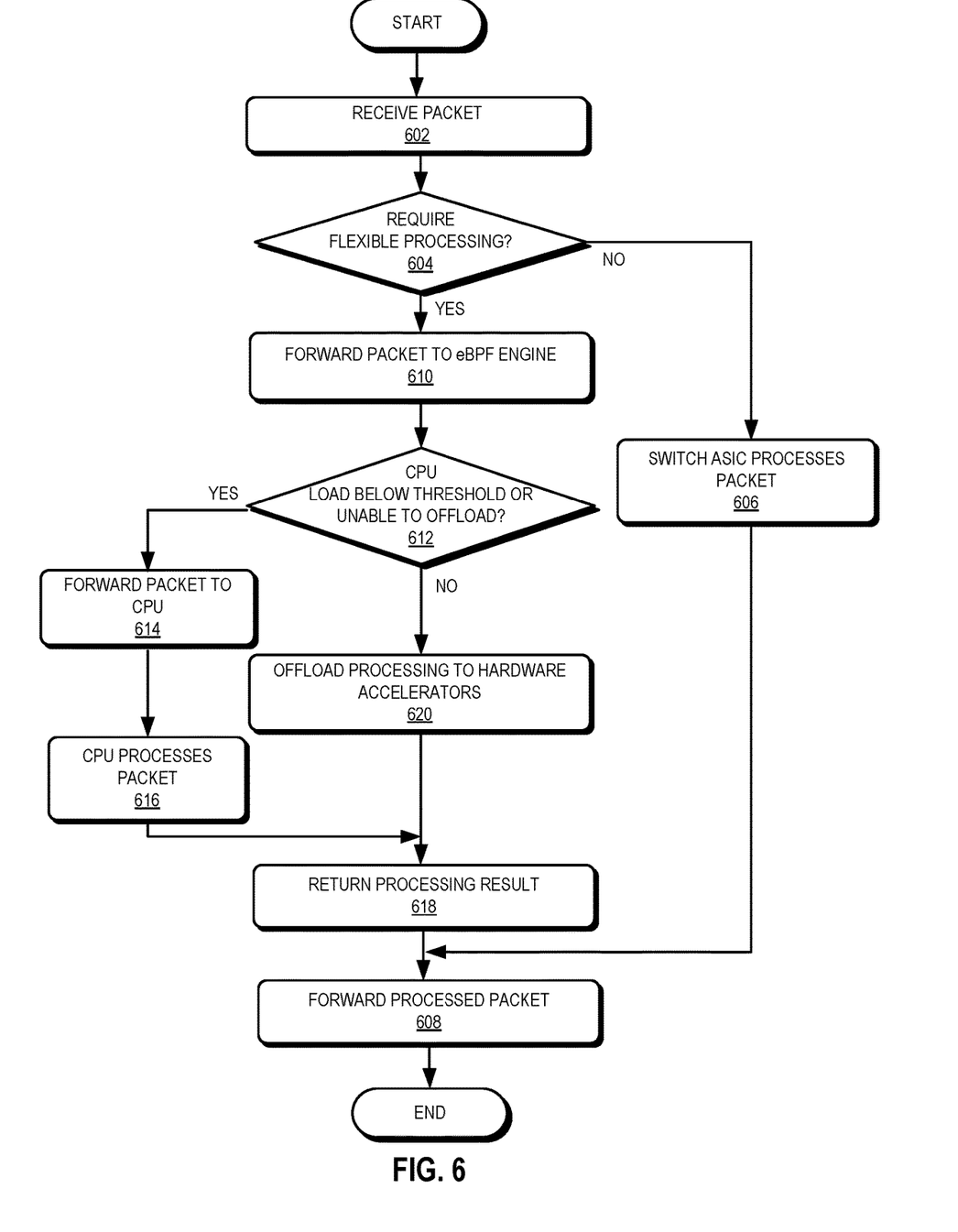
FIG. 6 presents a flowchart illustrating an exemplary packet-processing operation, according to one aspect of the instant application.

FIG. 6 presents a flowchart illustrating an exemplary packet-processing operation, according to one aspect of the instant application. During operation, a network switch receives a packet at one of its switch ports (operation 602). The standard switch ASIC on the switch port determines whether flexible processing on the packet is needed (operation 604). Note that the standard switch ASIC is designed to simply forward packets according to a predetermined set of rules and lacks the flexibility in handling certain exceptions to the forwarding rule or the ability to perform additional operations on the packets, such as encryption/decryption, encapsulation/decapsulation, flow identification, etc.

If no flexible processing is needed, the standard switch ASIC processes the packet (operation 606), and the switch port forwards the packet accordingly (operation 608). However, if flexible processing on the packet is needed, the standard switch ASIC forwards the packet to an eBPF engine positioned on the data path between the standard switch ASIC and the control plane CPU (operation 610). As discussed previously, a standard switch ASIC on the switch port can be modified to include the eBPF engine (e.g., as an integrated logic block within the switch ASIC). Alternatively, the eBPF engine can be a standalone device on the path between the switch ASIC and the control plane CPU or can be embedded in the network port of the control plane CPU.

The eBPF engine can then determine if the load on the control plane CPU is below a predetermined threshold or if the required processing cannot be offloaded to hardware (operation 612). Note that the term "CPU load" typically refers to the number of programs are using or waiting for the processor core. Here, the term "load" can refer to the number of packets waiting to be processed by the CPU. If the CPU load is below the threshold, the eBPF engine forwards the packet to the CPU (operation 614). Note that when the CPU load is below a predetermined threshold, processing the packet by the CPU does not affect performance (i.e., does not slow down the packets). On the other hand, the variety of hardware accelerators included in the eBPF engine can be limited and may not meet the current packet-processing need (e.g., a new type of encryption). In such situations, the control plane CPU can perform the needed operations. The CPU subsequently processes the packet (operation 616) and returns the processing result (operation 618). For example, if the operation is to encapsulate the packet, the encapsulated packet will be returned by the CPU to the switch ASIC. The switch port then forwards the processed packet (operation 608).

On the other hand, if the CPU load is not below the threshold and the eBPF engine determines that the operations can be offloaded to hardware, the eBPF engine can offload the required packet-processing operations to hardware accelerators (operation 620). In one example, operations that can be offloaded to hardware can include but are not limited to: encryption/decryption of packets, encapsulation/decapsulation of packets, packet-filtering operations (e.g., TCAM-based packet-filtering operations), flow-identification operations (which can be performed based on packet headers), data-analyzing operations (e.g., data mining), etc. Note that the hardware accelerators are part of the eBPF engine, and a function-helper logic block included in the eBPF engine provide interfaces to the hardware accelerators, such that, when the unmodified eBPF instruction calls a particular function, the operation is offloaded to a corresponding hardware accelerator. Regardless of whether the operations is to be performed by the hardware accelerator or the control plane CPU, the eBPF core may execute the same, unmodified eBPF instruction.

Subsequent to performing the operation, the appropriate hardware accelerator returns the packet-processing result (operation 618), and the switch port forwards the packet accordingly (operation 608).

In the examples shown in FIG. 3-FIG. 6, the offload engine is an eBPF offload engine that includes an eBPF core executing eBPF instructions. In practice, the offload engines can implement technologies other than eBPF as long as the offload technology can enable the smooth offload of software operations onto hardware accelerators. More particularly, the function-helper logic included in the offload engine is designed to mimic the "function calling" behavior of the software, such that no modification to the software code (i.e., the instructions executed by the offload engine) is made when the actual operation is offloaded to the hardware accelerators. This can ensure a smooth transition between the software-based operation and the hardware-based operation. Note that when the helper functions in the software change (e.g., every kernel release includes newer helper functions), the function-helper logic in the offload engine needs to be redesigned. However, the basic building blocks within the offload engine can remain the same.

One aspect provides a network switch. The network switch includes hardware-based packet-processing logic for processing received packets, a processing unit, and an offload engine coupled to the processing unit. The offload engine is to offload, from the processing unit, packet-processing operations associated with a subset of the received packets. The offload engine comprises a processor core, at least one hardware packet-processing accelerator for performing the packet-processing operations, and a function-helper logic for interfacing between the processor core and the hardware packet-processing accelerator.

In a variation on this aspect, the processor core of the offload engine executes unmodified extended Berkeley Packet Filter (eBPF) instructions without implementing an operating system.

In a variation on this aspect, the offload engine and the hardware-based packet-processing logic are positioned on a same application-specific integrated circuit (ASIC) chip.

In a variation on this aspect, the processing unit comprises a network port that facilitates communication between the processing unit and the hardware-based packet-processing logic, and the offload engine is embedded in the network port.

In a variation on this aspect, the offload engine includes one or more of: a packet encryption/decryption accelerator, a packet encapsulation/decapsulation accelerator, a packet-filtering accelerator, a flow-identification accelerator, and a data-analyzing accelerator.

In a variation on this aspect, the offload engine comprises an instruction memory for storing instructions to be executed by the processor core, and the instruction memory is accessible to the processing unit, thereby allowing the processing unit to load instructions into the instruction memory or to upgrade instructions stored in the instruction memory.

In a variation on this aspect, the offload engine comprises multiple processor cores that execute instructions in parallel.

In a variation on this aspect, the offload engine comprises multiple processor cores that execute instructions in a pipeline mode.

In a variation on this aspect, the offload engine is configured to not offload the packet-processing operations in response to determining that a load of the processing unit is below a predetermined threshold.

In a variation on this aspect, the processor core of the offload engine is configured to interpret a load double word (LDDW) instruction as two consecutive instructions, thereby allowing the LDDW instruction to be executed without modification.

One aspect provides a method for processing, by a switch, a network packet. The method can include: determining, by on the switch, whether a received packet requires a packet-processing operation outside of the hardware-based packet-processing logic; and forwarding the packet to a processing unit on the switch via an offload engine for the processing unit, in response to the packet requiring the packet-processing operation. The offload engine comprises a processor core, at least one hardware packet-processing accelerator, and a function-helper logic for interfacing between the processor core and the hardware packet-processing accelerator. The method further includes offloading the packet-processing operation to the hardware packet-processing accelerator via the function-helper logic.

In a variation on this aspect, offloading the packet-processing operation comprises executing, by the processor core, unmodified extended Berkeley Packet Filter (eBPF) instructions.

In a variation on this aspect, the offload engine and the hardware-based packet-processing logic are positioned on a same application-specific integrated circuit (ASIC) chip.

In a variation on this aspect, forwarding the packet to the processing unit comprises forwarding the packet to a network port on the processing unit, wherein the offload engine is embedded in the network port.

In a variation on this aspect, the offload engine includes one or more of: a packet encryption/decryption accelerator, a packet encapsulation/decapsulation accelerator, a packet-filtering accelerator, a flow-identification accelerator, and a data-analyzing accelerator.

In a variation on this aspect, the method comprises one or more of: storing, by an instruction memory in the offload engine, instructions to be executed by the processor core; loading, by the processing unit, instructions into the instruction memory; and upgrading, by the processing unit, instructions stored in the instruction memory.

In a variation on this aspect, the offload engine comprises multiple processor cores that execute instructions in parallel.

In a variation on this aspect, the offload engine comprises multiple processor cores that execute instructions in a pipeline mode.

In a variation on this aspect, the method comprises: in response to determining that a load of the processing unit is below a predetermined threshold, bypassing the offload engine to allow the processing unit to perform the packet-processing operation.

In a variation on this aspect, the processor core of the offload engine is configured to interpret a load double word (LDDW) instruction as two consecutive instructions, thereby allowing the LDDW instruction to be executed without modification.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A network switch, comprising:
hardware-based packet-processing logic for processing received packets;
a processing unit; and
an offload engine coupled to the processing unit;
wherein the offload engine is to offload, from the processing unit, packet-processing operations associated with a subset of the received packets; wherein the offload engine comprises a processor core that executes a set of unmodified extended Berkeley Packet Filter (eBPF) instructions without implementing an operating system, one or more hardware packet-processing accelerators for performing the packet-processing operations, and a function-helper logic for interfacing between the processor core and the hardware packet-processing accelerators;
wherein the function helper logic is to parse an eBPF function call executed by the processor core and send information associated with the eBPF function call to a corresponding hardware packet-processing accelerator;
wherein the offload engine further comprises an instruction memory for storing the unmodified eBPF instructions;
wherein the unmodified eBPF instructions are loaded into the instruction memory by the processing unit; and
wherein the processor core within the offload engine is configured to access the instruction memory to execute the unmodified eBPF instructions.

2. The network switch of claim 1, wherein the offload engine and the hardware-based packet-processing logic are positioned on a same application-specific integrated circuit (ASIC) chip.

3. The network switch of claim 1, wherein the processing unit comprises a network port that facilitates communication between the processing unit and the hardware-based packet-processing logic, and wherein the offload engine is embedded in the network port.

4. The network switch of claim 1, wherein the hardware packet-processing accelerators include one or more of:
a packet encryption/decryption accelerator;
a packet encapsulation/decapsulation accelerator;
a packet-filtering accelerator;
a flow-identification accelerator; and
a data-analyzing accelerator.

5. The network switch of claim 1, wherein the processing unit is further configured to upgrade the unmodified eBPF instructions stored in the instruction memory.

6. The network switch of claim 1, wherein the offload engine comprises multiple processor cores that execute instructions in parallel.

7. The network switch of claim 1, wherein the offload engine comprises multiple processor cores that execute the unmodified eBPF instructions in a pipeline mode.

8. The network switch of claim 1, wherein the offload engine is configured to not offload the packet-processing operations in response to determining that a load of the processing unit is below a predetermined threshold.

9. The network switch of claim 1, wherein the processor core of the offload engine is configured to interpret a load double word (LDDW) instruction as two consecutive instructions, thereby allowing the LDDW instruction to be executed without modification.

10. A method for processing, by a switch, a network packet, comprising:
determining, by hardware-based packet-processing logic on the switch, whether a received packet requires a packet-processing operation outside of the hardware-based packet-processing logic;
in response to the packet requiring the packet-processing operation, forwarding the packet to a processing unit on the switch via an offload engine coupled to the processing unit, wherein the offload engine comprises a processor core that executes a set of unmodified extended Berkeley Packet Filter (eBPF) instructions without implementing an operating system, one or more hardware packet-processing accelerators, and a function-helper logic for interfacing between the processor core and the hardware packet-processing accelerators;
offloading the packet-processing operation to a corresponding hardware packet-processing accelerator via the function-helper logic, which comprises the function helper logic parsing an eBPF function call executed by the processor core and sending information associated with the eBPF function call to the corresponding hardware packet-processing accelerator;
wherein the offload engine further comprises an instruction memory for storing the unmodified eBPF instructions;
wherein the unmodified eBPF instructions are loaded into the instruction memory by the processing unit; and
wherein the processor core within the offload engine is configured to access the instruction memory to execute the unmodified eBPF instructions.

11. The method of claim 10, wherein the offload engine and the hardware-based packet-processing logic are positioned on a same application-specific integrated circuit (ASIC) chip.

12. The method of claim 10, wherein forwarding the packet to the processing unit comprises forwarding the packet to a network port on the processing unit, wherein the offload engine is embedded in the network port.

13. The method of claim 10, wherein the hardware packet-processing accelerators include one or more of:
a packet encryption/decryption accelerator;
a packet encapsulation/decapsulation accelerator;
a packet-filtering accelerator;
a flow-identification accelerator; and
a data-analyzing accelerator.

14. The method of claim 10, further comprising:
upgrading, by the processing unit, the unmodified eBPF instructions stored in the instruction memory.

15. The method of claim 10, wherein the offload engine comprises multiple processor cores that execute instructions in parallel.

16. The method of claim 10, wherein the offload engine comprises multiple processor cores that execute the unmodified eBPF instructions in a pipeline mode.

17. The method of claim 10, further comprising:
in response to determining that a load of the processing unit is below a predetermined threshold, bypassing the offload engine to allow the processing unit to perform the packet-processing operation.

18. The method of claim 10, wherein the processor core of the offload engine is configured to interpret a load double word (LDDW) instruction as two consecutive instructions, thereby allowing the LDDW instruction to be executed without modification.

* * * * *